Oct. 7, 1969     H. G. DYKE     3,470,622

PENCIL CLIP

Filed Dec. 15, 1967     2 Sheets-Sheet 1

Oct. 7, 1969    H. G. DYKE    3,470,622
PENCIL CLIP
Filed Dec. 15, 1967    2 Sheets-Sheet 2

United States Patent Office

3,470,622
Patented Oct. 7, 1969

3,470,622
PENCIL CLIP
Herbert Gordon Dyke, P.O. Box 14, Dover, Del. 19901
Filed Dec. 15, 1967, Ser. No. 690,944
Int. Cl. B43k 25/00
U.S. Cl. 24—11                                    15 Claims

ABSTRACT OF THE DISCLOSURE

Clip, such as for pencil, pen, or tie holder, with a pair of side wings that may be squeezed together by opposed fingertips, in a direction transverse to the clip, with this squeezing action thereby spreading the clip outwardly from the pencil or other body to which it is attached, for clipping onto the clothing or removing it from same. Clip has side legs that bow out to the sides and an upwardly bowed top leg, the top leg being designed to flex at a region farther out from the pen than the side legs.

---

This invention is a clip incorporated in or that may be applied to pencils, pens, and the like, or may be incorporated into a tie holder. To avoid prolixity, it will be discussed herein as applied to a pen, as an example of its use.

The invention is best visualized in relation to carrying an expensive pen in the jacket pocket of an expensive suit, but has rather broad applicability.

If the spring clip on a pen does not give a substantial clipping force between the pen body and the free end of the clip, the pen can easily be dislodged and lost, which is not acceptable in the case of a fine pen.

If the spring clip has a strong grip and it is merely shoved down over the edge of the pocket, the cloth there will soon become worn and unkempt in appearance, which is not acceptable in the case of a fine suit. This worn appearance is aggravated in that many suits have reinforcement of natural white cloth, backing up the usually darker lining material of which the pocket is made. As the lining gets worn through, the white backing fabric is exposed.

On the other hand, if one opens up a strong clip with his fingernail each time he puts the pen in his pocket or takes it out, after a few times the fingernail gets pulled away from the flesh enough to be unpleasant or even painful.

On a good pen with fine lines, which may approach being an article of jewelry, no complicated mechanical gadget is tolerable, and this rules out many of the proposed solutions to the problem. The solution should be capable of being embodied in an integral or integrated clip of quite simple lines.

A further requirement resides in where and how any manipulative pressures are to be applied. I have found that the one fully acceptable manipulative pressure for this purpose is an equal squeezing in from the two opposite sides of the clip which action can be independent of the positioning of the pen and the raising or lowering of it. This also permits having any desired anti-slip surface for secure holding in place.

With a pen having the clip of my invention you can hold it by the clip wings, between thumb and fore-finger; when ready to open up the clip, merely squeeze the wings together; now the clip is opened out and you can put it in place with the clip over the top of the pocket, and release it there. It was convenient to handle; it didn't rub and wear the cloth of your pocket; there was no pulling of your fingernail; and the holding force of the spring clip can be greater than your squeezing force, to hold your pen in place securely.

My invention resides in forming a clip that has an anchor base and preferably three legs extending from it. The legs extend generally parallel to the pen. In plan view the side legs, or wings, are bowed out intermediate their ends. They are resiliently flexible enough so that pressure (between, for example, thumb and fore-finger tips) can squeeze them toward each other into more nearly straight lines. This elongates them. Since at one end they are secured to the anchor base, the squeezing action pushes the other end out farther from the anchor base by an opposed toggle action.

The center leg, or spine, is also secured to the anchor base at one end and to the wind members at the other. Desirably a ball or some type of foot is located at the free end of the clip, where spine and wings have come together.

Considering the pen as seen in FIGURE 2, the spine is attached between the anchor base and the foot at the free end of the clip, is fairly stiff longitudinally, and has a region where it can flex up and down, which region lies above the straight stress line of the wing members that runs from the location of their attachment to the foot to the location of their effective attachment to the anchor base. The spine's flex region lies preferably in is maximum height region, which is (lengthwise) preferably closer to the anchor base than to the foot. The spine is designed to flex upwardly from the pen, with its maximum flexibility preferably occurring in the region of the spine that is both highest up from the pen and lengthwise considerably removed from the free foot end.

The drawings illustrate an embodiment of my invention, all the views showing the clip on a pen.

Figure 1:
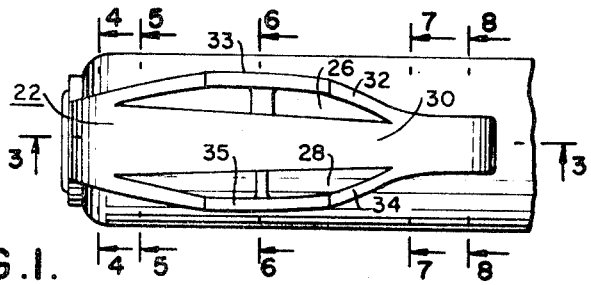
FIGURE 1 is a plan view of a clip embodying my invention.
Figure 4:
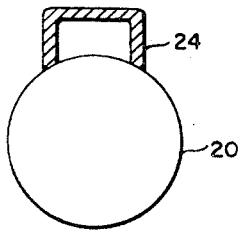
Figure 2:
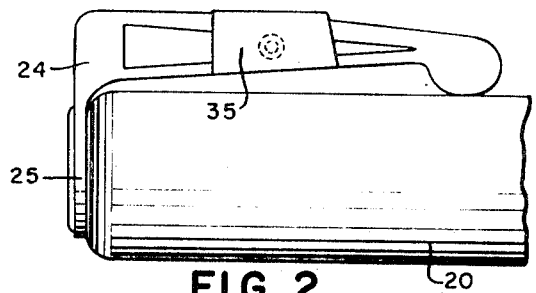
FIGURE 2 is a side view thereof.

FIGURES 4, 5, 6, 7 and 8 are lateral cross-sections taken on the lines 4, 5, 6, 7 and 8, respectively, of FIGURE 1.

Figure 6:
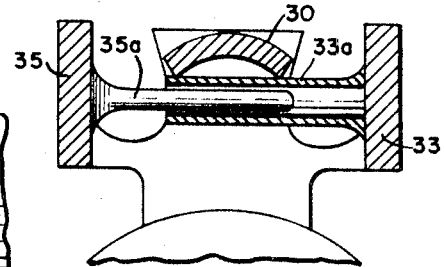
Figure 6A:
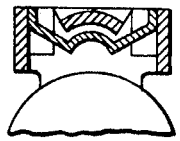
Figure 7:
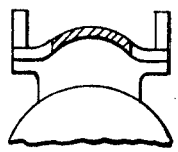

FIGURE 6a is an alternative to FIGURE 6.

Figure 9:
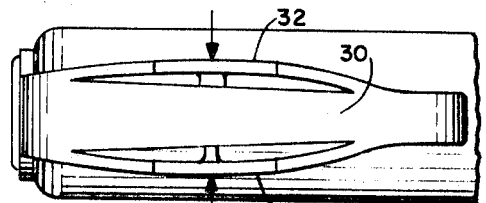

FIGURE 9 is a plan view of my clip showing the two side wing members squeezed together; the two arrows represent forces that might be applied along that line by a thumb and forefinger.

Figure 10:
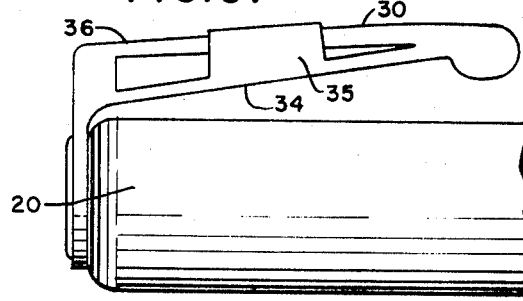
Figure 8:
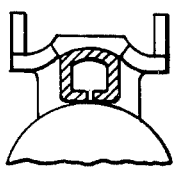

FIGURE 10 is a view of the clip in the squeezed condition as shown in FIGURE 9, but seen from the side; it will be observed here, as shown by the arrow, that the squeezing has raised the foot of the clip up off the surface of the pen.

FIGURES 11 through 17 show a somewhat different embodiment of my invention, incorporating the same principles.

Figure 11:
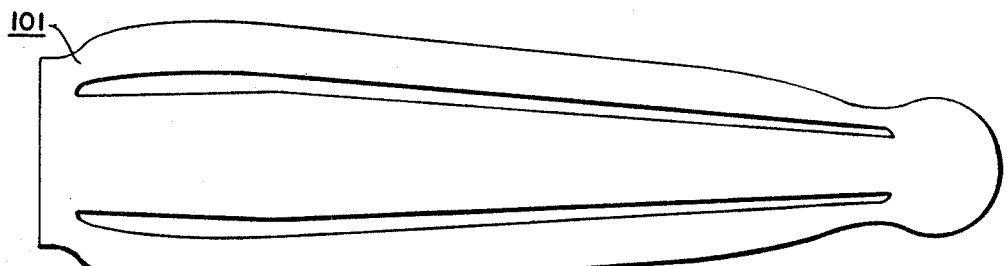

FIGURE 11 is a plan view of a flat die-cut blank for making my clip.

Figure 12:
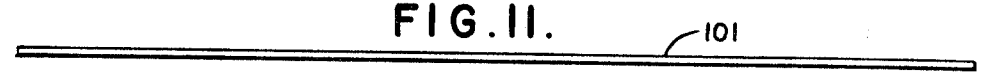

FIGURE 12 is a front elevation of the flat blank.

Figure 13:
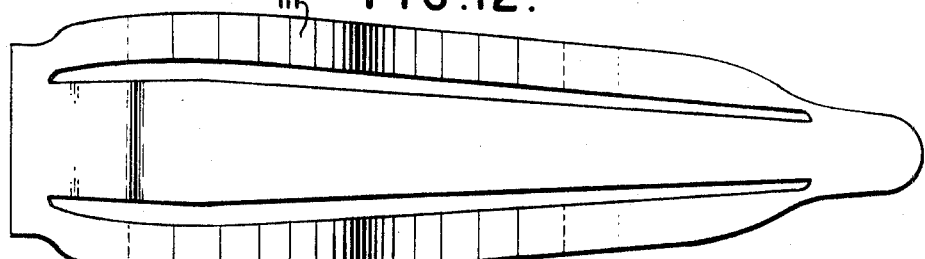
Figure 14:
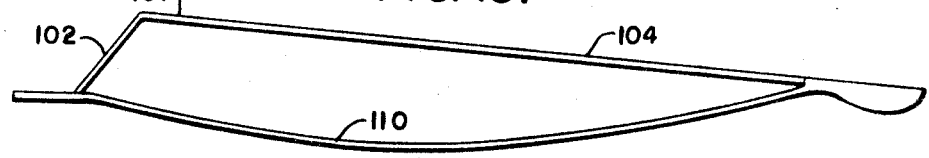

FIGURE 13 is a top view of the blank after it has been partially shaped, as more clearly seen in side elevation, FIGURE 14.

Figure 15:
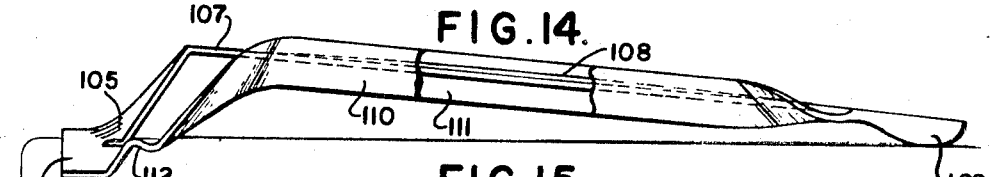

FIGURE 15 is a side elevation after further forming, notably the twisting of the wing members to make their main bights lie in the vertical.

Figure 16:
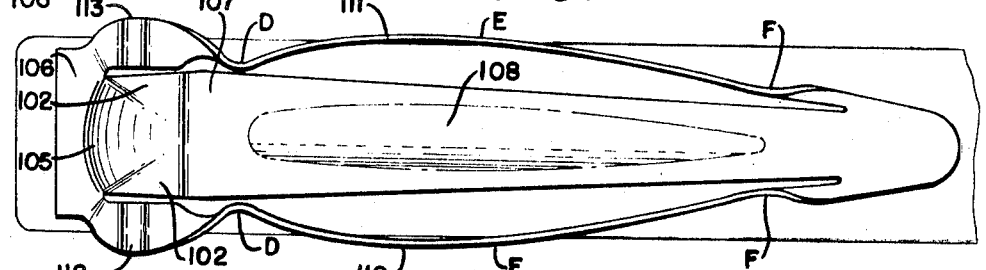

FIGURE 16 is a top view corresponding to FIGURE 15.

Figure 17:
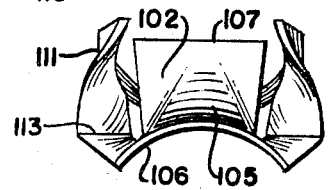

FIGURE 17 is a left end view corresponding to FIGURES 15 and 16.

FIGURES 1 through 10 of Sheet 1 will first be described.

Affixed in any suitable manner to the pen 20 is the clip 22 embodying the present invention. It has a solid anchor base 24 from which extends a fastening bracket 25, securely attached onto or about the pen at or near the end of the pen. The fastening bracket may be secured directly onto the cylindrical side surface of the pen, or it may be an angled extension secured at the extreme end of the pen, or a ring about the pen, or otherwise.

The base, held by the fastening bracket, extends a short distance out from the pen, and carries the clip legs, which extend parallel to the pen and near it.

The clip may embody the design illustrated here, or it may be styled differently, and it could be built up of assembled components. Intermediate its length there are two longitudinal cut-outs 26, 28 which divide the mid length of the clip into a longitudinal center leg, or spine portion 30, and two side legs, or wing portions 32, 34. The spine is of straight transverse cross-section at one location at least as seen at 36, that location preferably being closer to the anchor base than the foot. This serves as a flex hinge.

Figure 5:
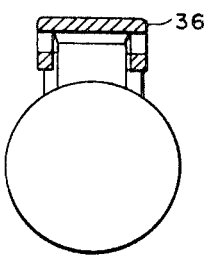
Figure 3:
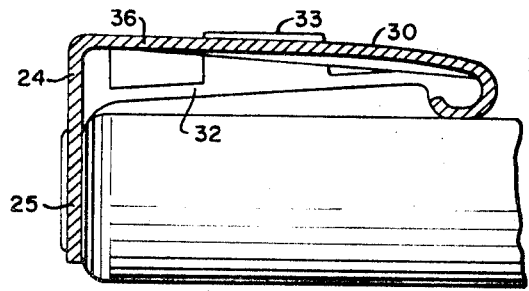
FIGURE 3 is a longitudinal section taken on the line 3—3 of FIGURE 1.

In the embodiment shown in the drawings, that straight cross-section is seen in FIGURE 5, and it occurs quite close to the base end of the clip. In any event, and as a necessary condition, the localized or distributed region of flex of the spine portion occurs at a height substantially farther up from the pen than the length expansion line, which is the line from where the wing members are effectively secured to the anchor base to where they are effectively secured to the foot.

Preferably, though not necessarily, the rest of the spine member 30 is curved or angled in transverse cross-section, making it longitudinally stiff.

The wing members 32, 34 have a substantial run of intermediate length freed from the spine member, as by the elongated cut-outs, and each wing member is joined to the spine member at its ends. The wing members in their free portions are bowed outwardly. They have upstanding widened ears or grips 33, 35, formed in them, preferably in the process of stamping the cut-outs between spine and wings. These grips are illustratively something like ⅛″ high by ⅜″ long, to facilitate their being gripped by opposed thumb and forefinger tips. The wings are of resilient material of thickness permitting the forces readily available between thumb and forefinger to flatten their bowed out arcs in toward each other. This flattening out elongates the lines that run from the base through the wing members to the foot member.

When these lines are elongated, since the spine cannot elongate substantially but can flex upwardly at its flex hinge region 36, and since that will move the foot farther away from the base end of the wings, it does flex upwardly pivotally at that region, in response to the elongation caused by the squeezing together of the wings. This lifts the clip's foot up from the pen, so the pen can be freely placed over the edge of the pocket or be removed from there.

What happens can be stated as: when the base of a triangle that has a fixed altitude and respectively constant length hypotenuse is elongated the angle between the altitude and the hypotenuse increases. Note that this is all in terms of the base 24 remaining fixed. The operation of this clip does not involve a change of the base itself in relation to the pen. That fact simplifies the design requirements for the securing bracket, which can be and desirably is solidly integral with the clip's base.

It should be noted that the wing members have to do some up and down flexing at their base ends and some in and out flexing at both ends. They are therefore slender at those end regions. The grip portions of the wings in between can be stiffer, and these grips may be formed intgerally, as part of the areas that made the cut-outs between the wings and the spine.

The arrows in FIGURE 9 indicate a line along which the wings, constituting a first means, are squeezed toward each other. The other parts of the structure constitute a second means mechanically coupled to the first and responding to the squeezing together by angular motion, indicated by the arrow in FIGURE 10, within the plane perpendicular to the line of the arrows of FIGURE 9.

If needed, a suitable means can be incorporated for preventing the tops of the wing grip members from twisting in toward each other. One such means is shown in FIGURE 6, where pin 35a, soldered to grip 35, projects into opposing sleeve 33a soldered to grip 33. These permit motion along the line toward and away but prevent twisting. An alternative means for preventing twisting is shown in FIGURE 6a, where there is shown a bent leaf spring secured to the top portions of the wings 33, 35 and extending under the spine 30. This exerts enough resistance to the tops of the wings being squeezed together to give a counter-force that opposes twisting.

It will be appreciated that a clip embodying these principles can be formed in many ways. Sheet 2 of the drawings, with its FIGURES 11 through 17, portrays what is presently believed to be a relatively simple and practical embodiment of the invention.

Here, a blank 101 is cut out of a piece of sheet metal. An edge of the blank is shown in FIGURE 12. The sheet metal will desirably be metal that is fairly easily cut and bent to new permanent shapes, and which can then be tempered or otherwise treated to give it a live, springy characteristic so it will come back to its formed shape after being forced out of it. It is also desirable that the metal be physically attractive, like stainless steel, or chrome plated steel of the more ordinary sort.

It will be observed in FIGURE 13 that the partially formed blank has shortened, due to the angular offset 102 seen in FIGURE 14. This is compensated for, as to the wing members 110, 111, by bowing them down. If desired, the transverse horizontal crimp at the base of each wing member may be forged at the same time.

It will be observed that the upwardly offset base end 102 of the spine member 104 has been deformed by a ridge 105 that runs across its foot where it joins the anchor part 106 that will be soldered, or the like, to the pencil or other body. This ridge member 105 gives a stiffening that prevents any flexing from the body up through the anchor member up through the base end, up to the top of the spine member. There, the spin member extends for a ways, perfectly flat, as to its transverse component, so that it can flex in that most elevated region 107. Thereafter, desirable, but not essentially, the spine member is slightly dished upwardly as seen at 108 to give it more stiffness and again force the flexing to occur back at the highest portion 107 of the spine member. The far end of the spine member, may, as shown, be wrapped around to form a smooth bulbous foot 109 at that tip end.

Since the spine member was shortened by the offset bend, the wing members must be also. This will be brought about, in part, by the twisting up and bowing out of the wing members. Any additional amount needed can advantageously be accomplished by crimping the wing members near the base end, with the crimps 112, 113 running transverse, horizontal. This also has the advantage of facilitating vertical flexing of the wing members, in a limited pivot type action at that region.

It will be observed that the spine member must flex upward at elevated point 107 and the wing members must flex upward at lower points 112, 113. Their juncture at the other end has bodily motion, but practically no flexing in the vertical sense.

The wing members flex inwardly at points D and F, when the intermediate regions E are pressed together. These intermediate regions are raised sufficiently that they come opposite the mid reach of the spine member. Thus, if one were to press too hard, in squeezing the wing members together, the spine member would serve as a stop to prevent their going too far past dead center or being bent beyond their elastic limit or being twisted.

The anchor end of the clip, at and near where it is soldered, brazed, or otherwise secured to the body, is somewhat difficult to illustrate in a line drawing, so it will be described in more detail. The leftmost end of the anchor portion is bent arcuately to fit against and be secured to the body, which, for example, may be a pen or pencil. Centrally, there starts the reinforcing ridge 105 above described, immediate or very soon. Then, to the sides of the ridge we have the base end 102 of the spine member. Outboard of that, we have the anchor part 106 first, curled well down against the body, but quickly starting from its outer edge and twisting up. As it comes approximately opposite the slanting base of the spine member, each wing member is here horizontal, so it can flex up and down about this as a pivot axis. An up and down crimp 112, 113 may be incorporated here, having its transverse components all horizontal, so this flexing is facilitated. Immediately on from that, the wing member resumes twisting up and in, in the same direction as before, and does so until it becomes vertical. Where it becomes vertical, it is pressed well in close to the spine as indicated at D. Then it bows outwardly and curves on back inwardly to the last vertical portion near the tip, seen at F. Then it twists back in the opposite direction to resume being horizontal as it merges with the tip portion of the spine.

If the clip of my invention is incorporated in a tie holder the drawings hereof will be generally applicable, but the body to which the anchor base of the clip is attached, instead of being a pencil or pen, will be the front, decorative, bar of a tie holder. Note in respect of that application that the tie clip can then be shallower, from the wearer's body out, than the usual spring tie clip, and also pressure in, as in leaning against a desk, does not open up the tie clip of this invention.

I claim:

1. Clip for attaching a body, such as a pencil, pen or tie holder to the clothing, comprising at least one horizontally outwardly bowed wing leg that effectively elongates when squeezed in and flattened within a generally horizontal plane, a base member and a spine member connected together, one end of such wing leg being secured to the base member near its low end, a vertical flex region of the spine member being provided and lying above the horizontal plane of the ends of the wing leg where attached respectively to the spine member and the base member.

2. Clip as in claim 1 in which the spine has its maximum flexibility for swinging away from the article body at near the location of its maximum height from the article body.

3. Clip as in claim 1 in which there are two bowed wings and they have upstanding ears adapted to be squeezed toward each other by the user's fingertips.

4. Clip for attaching a body, such as a pen, pencil, or tie holder to the clothing, comprising horizontally bowed wing legs and a spine having a portion higher from the article body than are the wing legs, the clip having a base at the end adapted for fastening to the article body, the horizontally bowed wings being attached to that base and the raised spine being attached to that base, the bowed wings being capable of being flexed so they can be squeezed into a flattened and elongated shape, the raised spine being in part above the height of the straight lines between the ends of the wing legs, the raised spine having a region of upward and downward flexibility which region is farther away from the pen than the aforementioned straight lines between the ends of the wing legs.

5. Clip as in claim 4 in which the highest raised part of the spine is its most flexible part, up and down, and that part lies relatively close to the base end of the clip.

6. Clip having a first means which is inflexibly secured to a body such as a pen, pencil, or clip bar, and which is resiliently squeezable inward along one line by opposed pressure forces and having second means mechanically coupled to said first means to respond by angular motion within the plane perpendicular to said line, said second means having a gripping surface near its end away from its effective pivot of angular motion.

7. Clip as in claim 6 in which the squeezable together first means is provided with wing grips for the fingers to press against, and anti-tilt means is provided on the wing grips for preventing them from tilting in toward each other.

8. Clip as in claim 7 in which the anti-tilt means is a pin secured on one wing grip slidable within a sleeve secured on the other wing grip.

9. Clip as in claim 7 in which the anti-tilt means is a bent leaf spring secured near the upper edges of the wing grips.

10. Clip as in claim 6 cut from soft sheet metal, stamped to provide the described kind of configuration, and then treated to make the soft metal springy.

11. Clip having a first means resiliently squeezable inward along one line by opposed pressure forces and having second means mechanically coupled to said first means to respond by angular motion within the plane perpendicular to said line, said second means having a gripping surface near its end away from its effective pivot of angular motion, said clip being stamped out of a flat piece of deformable sheet metal by cutting and forming, and the wing members being twisted so as to be, in part, disposed horizontally and, in part, disposed vertically.

12. Clip as in claim 11 in which a spine member is bent up abrupt and short from the fastening bracket and slopes gently back down from there to its far tip, while the wing members are also bent up rather abruptly at the base end and slope gently back down toward the tip end.

13. Clip as in claim 12 in which the spine flexes vertically at the top of its abrupt offset bend, and the wings flex vertically at the bottom of their abrupt offset bend.

14. Clip as in claim 13 in which the bowed portions of the wing members that have been twisted into vertical posture, lie directly outward of the spine member, which thereby limits their bowing in to approximately their momentarily fully unbowed configuration.

15. Pen, pencil, or the like having attached to the body thereof a stiff base extending out from the body, a spine member extending along the body with a first end flexible and attached to the base out from the body and a second end being a gripping end and spring-pressed against the body, and a resilient bowed-out member, elongated by squeezing in horizontally, attached at one of its ends to the base closer to the body than where the spine member is attached, and its other end being attached to the spine member in the vicinity of its gripping end.

References Cited

UNITED STATES PATENTS

| 2,009,941 | 7/1935 | Mix. |
| 2,318,950 | 5/1943 | Larmour _____ 24—11 |
| 3,082,773 | 3/1963 | Renstrom et al. |
| 3,170,470 | 2/1965 | Solomon. |

FOREIGN PATENTS

| 635,533 | 9/1936 | Germany. |

DONALD A. GRIFFIN, Primary Examiner